Dec. 20, 1932. W. F. DALZEN 1,891,276
ROCK DRILL
Filed Nov. 26, 1930
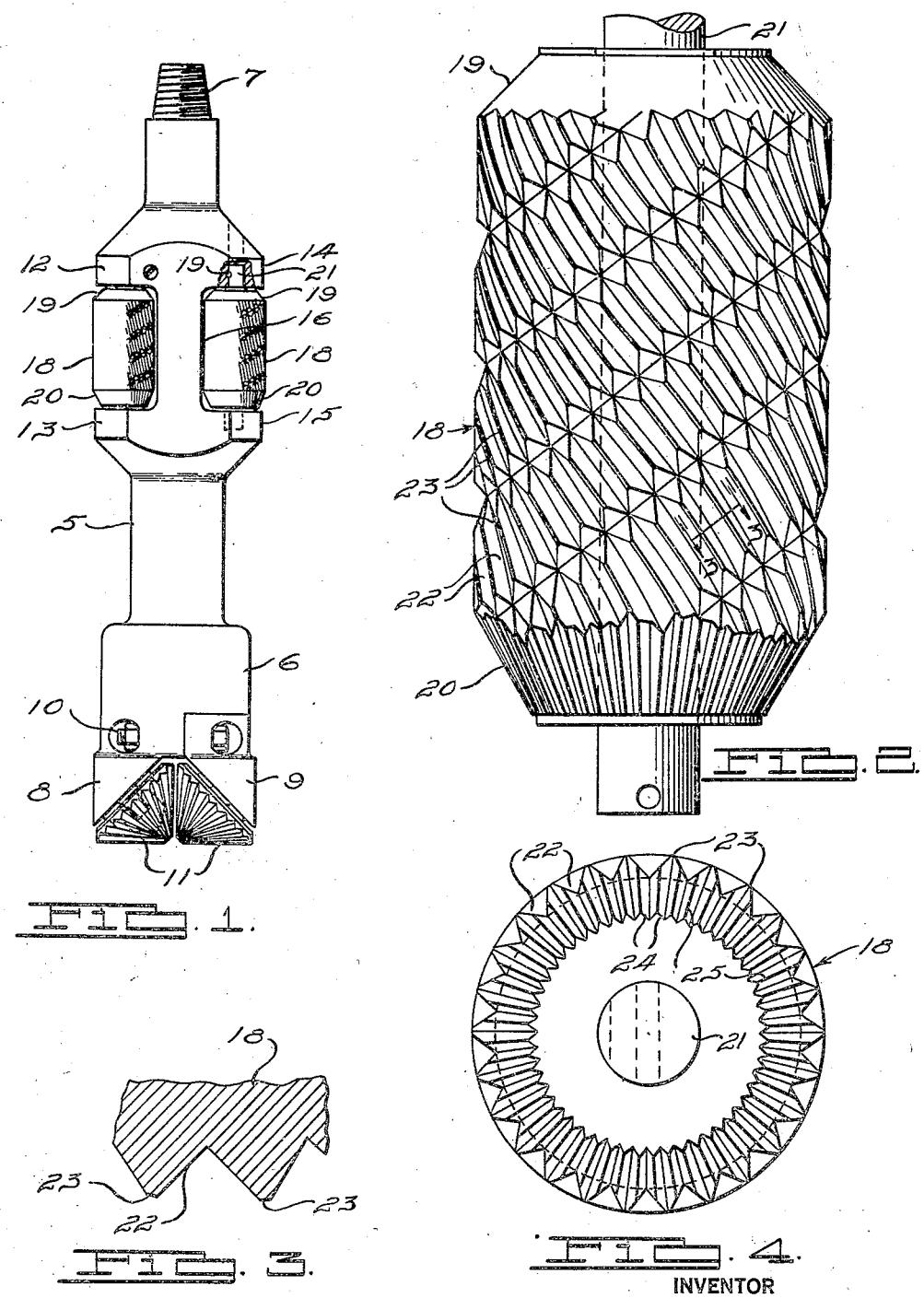

Patented Dec. 20, 1932

1,891,276

UNITED STATES PATENT OFFICE

WILLIAM F. DALZEN, OF GROSSE POINTE, MICHIGAN

ROCK DRILL

Application filed November 26, 1930. Serial No. 488,369.

This invention relates to improvements in rock drills or earth boring tools and more particularly to improvements in the reaming elements thereof.

In rock drills the head or end of the bit is provided with conical cutters for boring vertically, and reamers are provided in the sides of the shanks of the bits for sizing the hole and guiding the tool in a straight line. The reamers are usually cylindrical in shape with angular end surfaces, and heretofore the teeth have been straight, or formed by continuous grooves or flutes, co-planar with the axis of the reamer, or in right lines on the surface of the cylinder, the cuts being continuous over the cylindrical surface and also over the frusto-conical ends. With the teeth in a straight line, the cutting pressure was distributed along the length of the cutting edge, which extended the full length of the cylinder, making the cutting pressure for a unit of length relatively low. Also the cutting is somewhat irregular due to the alternate engagement or registration of the cutting edges and then the grooves with the circumference of the bore, tending to throw the tool sidewise, especially when conditions occurred where the cutting edge was presented on one side of the tool while at the opposite side the grooved space was presented to the wall of the bore. In solid rock formation the tool is apt to chatter and vibrate.

Accordingly, objects of this invention are to provide a rock drill reamer in which the teeth or cutting edges are distributed evenly over the entire surface of the cylinder, and the teeth broken up or engaging in short lengths so that the instantaneous cutting is reduced and the cutting distributed evenly and continuously throughout the rotation of the bit. Further objects are to provide a reamer in which the teeth in the cylindrical surface are well adapted for resisting heavy pressure and wear, while the teeth in the angular surfaces may be fine and sharp and better suited for cutting vertically.

Other objects and advantages will become apparent in the following description with reference to the accompanying drawing in which:

Fig. 1 is a side elevation of a rock drill bit, in which an illustrative embodiment of my invention is shown.

Fig. 2 is an enlarged detail view of one of the reamers shown in Fig. 1.

Fig. 3 is a fragmentary cross-section showing the tooth profile, taken on line 3—3 of Fig. 2.

Fig. 4 is an end elevation of Fig. 2.

The rock drill comprises a shank portion 5 on the lower end of which is formed an elliptical head 6, and the upper end 7 is threaded for attaching the bit to the boring drill rods on which the bit is mounted. The lower end of the head is provided with angular projections or fingers 8 and 9, the finger 8 being cast integrally with the head and the finger 9 being removably secured in position by means of two through bolts 10. On the angular surfaces of the projections are rotatably mounted a pair of cutting cones 11 for vertical boring, in a well known manner.

Above the head and nearer the upper end of the shank are formed the oppositely disposed pairs of radially projecting shoulders 12 and 13, and 14 and 15, and the bit is recessed at 16 between the shoulders for receiving the reamers 18. The reamers have a cylindrical body and angular or frusto-conical ends 19 and 20, and are rotatably supported on the shafts 21 which are inserted through the upper shoulders 12 and 14, through the reamers and projected into the lower shoulders 13 and 14, the shafts being secured in position by the lock pins 19. Thus, the reamers 18 are mounted in parallel relation to each other and to the axis of the bit, and diametrically opposed.

The reamers being identical, a description of one will suffice for both. In the cylindrical body portion of the reamer are cut helical flutes or grooves 22 forming flat topped helical teeth or cutting edges 23. The teeth 23 are notched by helical cuts running around the cylinder in the opposite hand to the flutes as shown in Fig. 2. The lower angular end surface of the reamer is fluted with straight grooves 24, co-planar with the axis, and forming the straight sharp teeth 25 which are finer and more closely spaced than the side cutting teeth 23. These teeth may also be helically arranged, if desired.

It is now manifest that on the right lines of the cylindrical surface in contact with the circumference with the bore, there are at all times several teeth fully engaged and the pressure is applied to a plurality of points, or in effect short cutting edges, and not on one single edge extending continuously over the length of the cylinder. The effective unit cutting pressure is increased; the cutting effort and effect is uniform throughout the rotation of the bit; and the tool is guided steadily. The rock drill having a reamer, according to this invention, forms a very straight and smooth hole, and cuts freely.

By milling the grooves for making the end and the side teeth in separate operations, the teeth in the sides, where the wear is most severe, can be made larger and somewhat blunt, and still retain straight fine teeth in the frusto-conical end. The angular end teeth may be very sharp and closely spaced as is suitable for vertical cutting to enlarge the hole, following the end cutters, and the helical teeth in cylindrical surfaces have substantially the same twisting cutting action that the straight teeth in the beveled surface have which is most effective for loosening the formation.

While I have shown but one illustrative embodiment of my invention, any alterations may be had without departing from the spirit of same as defined in the following claims:

I claim:

1. A rock drill reamer having cylindrical side cutting surfaces with elongated teeth of helical shape disposed in helical rows thereon, and a frusto-conical lower end portion having straight teeth.

2. A rock drill reamer comprising a cylindrical body portion having flutes or grooves having a large lead intersected by helical flutes or grooves of the opposite hand and of less lead forming helical rows of elongated teeth and additional cutting teeth at the lower end of said reamer.

3. A rock drill bit reamer having a cylindrical body portion helically fluted in one direction with grooves closely spaced together and provided with a large lead and helically fluted in the opposite direction with grooves of larger spacing and with relatively smaller leads forming cutting teeth therebetween.

4. An earth boring drill reamer comprising a cylindrical body having frusto-conical ends, a cylindrical surface having spaced helical grooves of opposite hand and different lead forming teeth with elongated helical top edges, and a lower end surface having straight grooves providing sharp teeth.

5. An earth boring drill reamer comprising a cylindrical body having frusto-conical ends, and a cylindrical surface having spaced helical grooves forming threads having top cutting edges, the thread being notched by oppositely extending grooves of relatively sharper lead forming elongated helical cutting teeth.

WILLIAM F. DALZEN.